(12) United States Patent
Madler et al.

(10) Patent No.: US 8,262,101 B2
(45) Date of Patent: Sep. 11, 2012

(54) MODULAR ROUGH TERRAIN VEHICLE

(76) Inventors: Herman Madler, Mount Prospect, IL (US); James R. Madler, Chicago, IL (US)

(*) Notice: Subject to any disclaimer, the term of this patent is extended or adjusted under 35 U.S.C. 154(b) by 372 days.

(21) Appl. No.: 12/578,005

(22) Filed: Oct. 13, 2009

(65) Prior Publication Data

US 2011/0084457 A1 Apr. 14, 2011

(51) Int. Cl.
*B60P 1/36* (2006.01)
(52) U.S. Cl. ............. 280/6.156; 280/6.154; 180/24.11; 180/24.12; 180/251
(58) Field of Classification Search .............. 180/373, 180/24.01, 24.11, 24.12, 231, 375, 251; 280/6.156, 280/6.154
See application file for complete search history.

(56) References Cited

U.S. PATENT DOCUMENTS

| 487,753 | A | | 12/1892 | Koenig | |
|---|---|---|---|---|---|
| 631,383 | A | * | 8/1899 | Ringheim | 180/366 |
| 939,077 | A | * | 11/1909 | Palmer | 180/24 |
| 1,095,183 | A | | 5/1914 | Beaman | |
| 1,118,835 | A | * | 11/1914 | Adams | 180/364 |
| 1,151,561 | A | | 8/1915 | Bollinger | |
| 1,363,327 | A | | 12/1920 | Larsh | |
| 1,372,068 | A | * | 3/1921 | Freeman | 180/299 |
| 1,680,553 | A | * | 8/1928 | Krotz | 180/6.66 |
| 1,828,841 | A | * | 10/1931 | Kingsley | 180/246 |
| 2,461,391 | A | * | 2/1949 | Osterhaus | 474/86 |
| 2,579,556 | A | * | 12/1951 | Drong | 280/677 |
| 2,583,250 | A | | 1/1952 | Ball | |
| 2,671,519 | A | * | 3/1954 | Cheramie | 180/6.48 |
| 2,792,234 | A | | 5/1957 | Page | |
| 2,872,200 | A | | 2/1959 | Kroll | |
| 2,883,777 | A | | 4/1959 | Gurries | |
| 2,999,695 | A | * | 9/1961 | Bixby et al. | 280/681 |
| 3,001,798 | A | | 9/1961 | Logan | |
| 3,008,724 | A | | 11/1961 | Lapins | |
| 3,033,584 | A | * | 5/1962 | Carmichael, Jr. et al. | 280/6.154 |
| 3,037,394 | A | * | 6/1962 | Watkins | 474/86 |
| 3,052,480 | A | | 9/1962 | Sanstrom | |
| 3,059,397 | A | * | 10/1962 | Anderson et al. | 56/16.2 |
| 3,291,244 | A | * | 12/1966 | Garrett | 180/235 |
| 3,292,943 | A | | 12/1966 | Crockett | |
| 3,309,097 | A | | 3/1967 | Seeber | |
| 3,313,555 | A | * | 4/1967 | Reimer | 280/104 |
| 3,424,261 | A | * | 1/1969 | Sheldon | 180/69.6 |
| 3,480,098 | A | | 11/1969 | Ward | |
| 3,506,079 | A | | 4/1970 | Madler et al. | |
| 3,512,599 | A | * | 5/1970 | Haddix et al. | 180/217 |

(Continued)

*Primary Examiner* — Paul N Dickson
*Assistant Examiner* — Nicole Verley
(74) *Attorney, Agent, or Firm* — Greer, Burns & Crain, Ltd.

(57) ABSTRACT

A rough terrain vehicle including an elongated main frame for supporting a self-contained v-haul body; first and second forwardly-extending frame arms located on opposite sides of the main frame; third and fourth rearwardly-extending frame arms located on opposite sides of the main frame, each arm having a wheel mounted thereon. Also included are first and second cross members pivotably connected to the arms configured to enable the main frame and the frame arms to pivot about a lengthwise axis of the main frame. First and second length-adjustable member operatively connected to the first frame arm and the third frame arm and the second frame arm and the fourth frame arm, respectively; selective movement of each length-adjustable member causing the associated arm to move up or down; and a level detector for producing and applying leveling signals to each of the length-adjustable members to maintain the elongated main frame in a relatively level orientation when the vehicle encounters uneven terrain.

15 Claims, 12 Drawing Sheets

U.S. PATENT DOCUMENTS

| | | | | |
|---|---|---|---|---|
| 3,525,534 | A | 8/1970 | Madler et al. | |
| 3,653,455 | A * | 4/1972 | Hetteen | 180/251 |
| 3,792,748 | A | 2/1974 | Regier | |
| 3,806,141 | A | 4/1974 | Janer | |
| 3,831,964 | A * | 8/1974 | Campbell et al. | 280/81.6 |
| 3,917,306 | A * | 11/1975 | Madler et al. | 280/104 |
| 4,053,170 | A * | 10/1977 | Hyler et al. | 280/6.154 |
| 4,186,814 | A | 2/1980 | Hart | |
| 4,416,109 | A | 11/1983 | Slazas | |
| 4,492,389 | A * | 1/1985 | Wyatt et al. | 280/86.5 |
| 4,647,067 | A * | 3/1987 | Paquette et al. | 280/676 |
| 4,741,549 | A * | 5/1988 | Gevers | 280/407.1 |
| 4,750,751 | A * | 6/1988 | Schafer | 56/16.5 |
| 5,505,482 | A * | 4/1996 | VanDenberg | 280/86.5 |
| 5,547,207 | A * | 8/1996 | Madler | 280/104 |
| 5,655,615 | A * | 8/1997 | Mick | 180/24.02 |
| 5,755,382 | A | 5/1998 | Skotinkov | |
| 5,772,237 | A * | 6/1998 | Finch et al. | 180/65.1 |
| 5,921,337 | A * | 7/1999 | Okamoto | 180/41 |
| 5,937,963 | A * | 8/1999 | Urbanczyk | 180/208 |
| 5,946,893 | A | 9/1999 | Gordon | |
| 6,112,843 | A * | 9/2000 | Wilcox et al. | 180/345 |
| 6,131,919 | A * | 10/2000 | Lee et al. | 280/6.154 |
| 6,299,181 | B1 * | 10/2001 | Ericksson | 280/6.156 |
| 6,386,554 | B1 * | 5/2002 | Weddle | 280/6.154 |
| 6,443,687 | B1 * | 9/2002 | Kaiser | 414/685 |
| 6,488,110 | B2 * | 12/2002 | Price | 180/251 |
| 6,695,328 | B2 | 2/2004 | Cope | |
| 6,698,172 | B2 | 3/2004 | Ferris et al. | |
| 7,104,548 | B2 * | 9/2006 | Ichimura et al. | 280/6.154 |
| RE39,477 | E * | 1/2007 | Nellers et al. | 280/754 |
| 7,309,081 | B1 | 12/2007 | Zuhlsdorf | |
| 7,401,794 | B2 * | 7/2008 | Laurent et al. | 280/5.514 |
| 7,494,141 | B2 | 2/2009 | Bouton | |
| 7,562,887 | B1 * | 7/2009 | Sutton et al. | 280/124.112 |
| 7,735,574 | B2 * | 6/2010 | Smart et al. | 172/799 |
| 7,810,823 | B2 * | 10/2010 | Van Mill et al. | 280/81.6 |
| 7,866,671 | B2 * | 1/2011 | Madler | 280/6.154 |
| 7,946,596 | B2 * | 5/2011 | Hsu et al. | 280/5.509 |
| 7,963,361 | B2 * | 6/2011 | Coers et al. | 180/403 |
| 8,011,461 | B2 * | 9/2011 | Rodriguez et al. | 180/65.23 |
| 8,042,817 | B2 * | 10/2011 | Motebennur et al. | 280/5.514 |
| 2005/0189730 | A1 * | 9/2005 | White | 280/6.154 |
| 2005/0205329 | A1 | 9/2005 | Fanger-Vexler | |
| 2006/0220331 | A1 * | 10/2006 | Schafer et al. | 280/6.154 |
| 2008/0284118 | A1 | 11/2008 | Venton-Walters et al. | |

* cited by examiner

MODULAR ROUGH TERRAIN VEHICLE

BACKGROUND OF THE INVENTION

This invention relates generally to an automatic leveling vehicle used to keep the vehicle's operator level when traveling on uneven terrain, and more particularly, to an all terrain vehicle which supports and maintains an operator portion of the vehicle body in a relatively level position even when the vehicle is traveling along a slanted grade or uneven terrain.

Many vehicles have been designed to operate off of improved roadways and over uneven terrain. Such vehicles typically include a rigid, parallel frame and a fixed wheelbase. When such a vehicle travels along a slanted grade or uneven terrain, the wheels on one side of the vehicle are lower than the wheels on the other side of the vehicle, so the vehicle body necessarily adopts a tilted orientation roughly equal to the slanted grade of the ground. The tilted orientation of the vehicle body can be quite uncomfortable and can cause fatigue for the driver and passengers, particularly when the grade is steep. There is also a danger the vehicle will roll over.

SUMMARY OF THE INVENTION

Embodiments of the present invention are directed to a rough terrain vehicle including an elongated main frame for supporting a body; first and second forwardly-extending frame arms located on opposite sides of the main frame, each of which includes a proximal end and a distal end, each proximal end being pivotably connected to the main frame, and each the distal end having at least one rotatable wheel mounted to each arm; third and fourth rearwardly-extending frame arms located on opposite sides of the main frame, each of which includes a proximal end and a distal end, each the distal end having at least one rotatable wheel mounted to each arm; a first generally U-shaped cross member pivotably connected to the first and second frame arms and supporting a forward end of the main frame; a second generally U-shaped cross-member pivotably connected to the third and fourth frame arms and supporting a rearward end of the main frame; the cross members being configured to enable the main frame and the frame arms to pivot about a lengthwise axis of the main frame for the purpose of maintaining the main frame level from side to side. Also included is a first length-adjustable member operatively connected to the third frame arm and the first frame arm; selective movement of the first length-adjustable member causing the distal end of the first frame arm to move up or down; a second length-adjustable member operatively connected to the fourth frame arm and the second frame arm; selective movement of the second length-adjustable member causing the distal end of the second frame arm to move up or down; and a level detector for producing and applying leveling signals to each of the length-adjustable members; the leveling signals causing each of the length-adjustable members to position each the first and second frame arms such that the elongated main frame is maintained in a relatively level orientation when the vehicle encounters uneven terrain.

Also included is a trailer for traveling over rough terrain and attached to a vehicle that includes a motor for pulling the trailer, the trailer including an elongated main frame for supporting a trailer body; a plurality of rearwardly-extending frame arms located on opposite sides of the main frame, each of which includes a proximal end and a distal end; each proximal end being pivotably connected to the main frame and each distal end having at least one rotatable wheel mounted thereon; a generally U-shaped cross member associated with the plurality of frame arms for supporting the main frame, the cross-member being pivotably connected to the plurality of frame arms and being configured to enable the main frame and the plurality of frame arms to pivot about a lengthwise axis of the main frame for the purpose of maintaining the main frame level from side to side; a pivot axle associated with the plurality of frame arms for connecting the proximal ends of each the plurality of frame arms, the pivot axle permitting relative movement of the plurality of frame arms about the pivot axle; at least one length-adjustable member operatively connected to the main frame and at least one of the plurality of frame arms; selective movement of the length-adjustable member causing the distal end of at least one of the plurality of frame arms to move up or down; a level detector for producing and applying leveling signals to each of the length-adjustable members; the leveling signals causing each of the length-adjustable members to position each the first and second frame arms such that the elongated main frame is maintained in a relatively level orientation when the vehicle encounters uneven terrain.

DETAILED DESCRIPTION OF THE EMBODIMENTS

Figure 1:
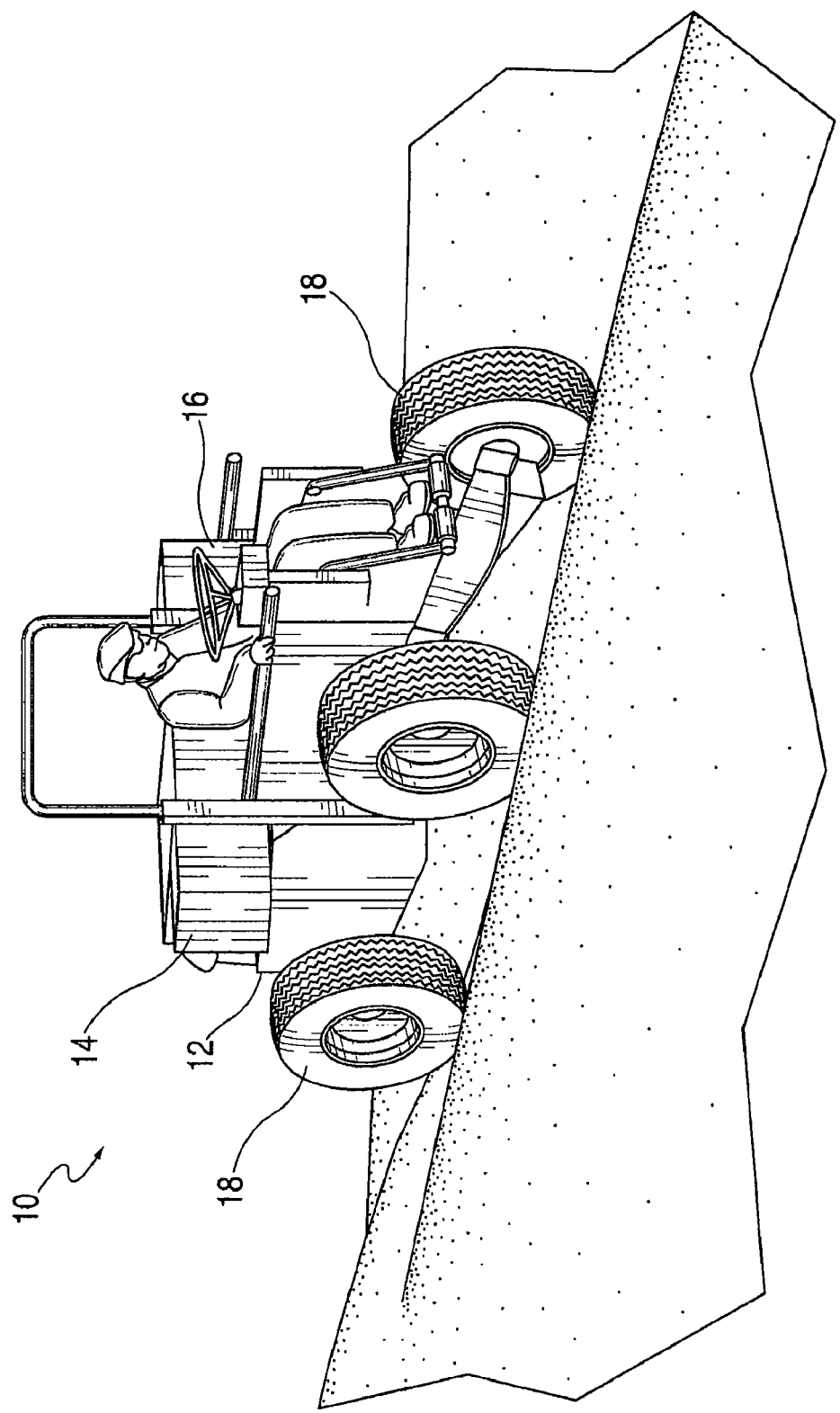
FIG. 1 is a front perspective view of the present modular rough terrain vehicle on uneven terrain.
Figure 11:
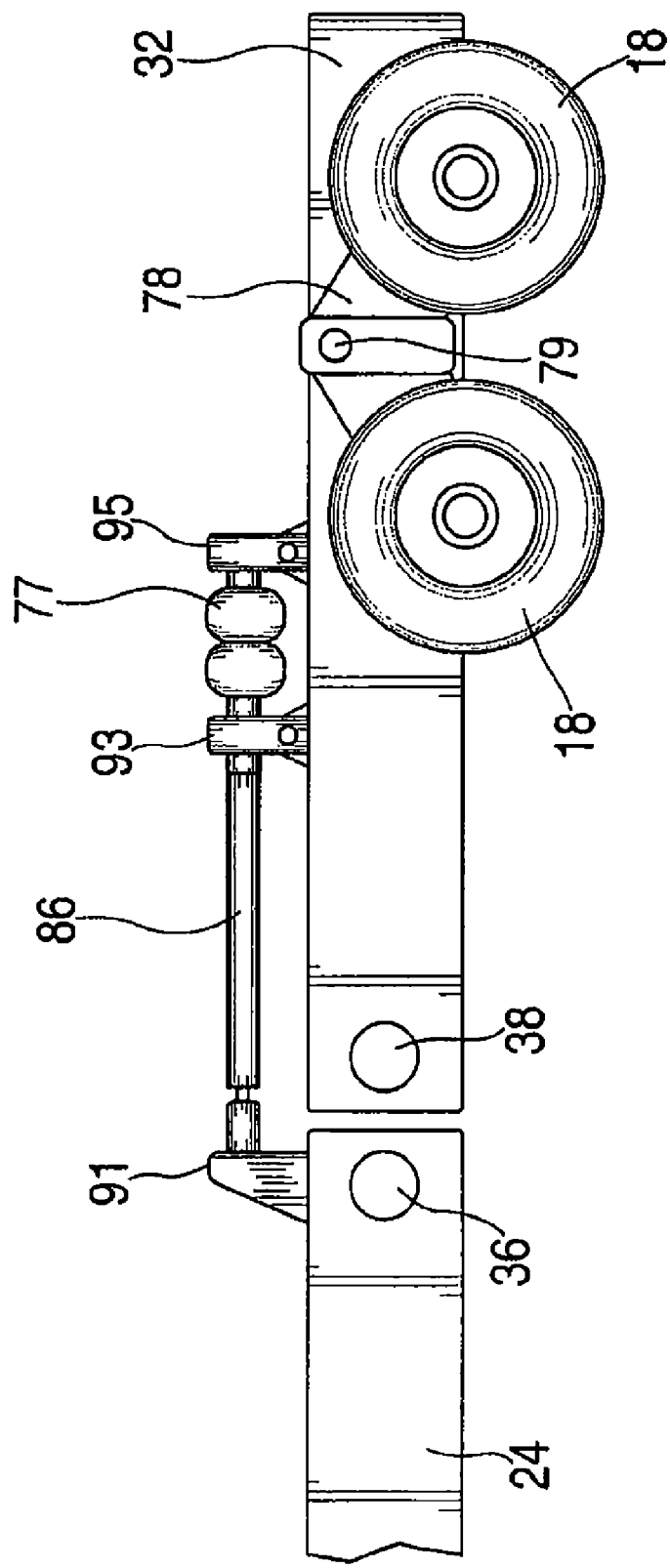
FIG. 11 is an elevated view of a length adjustable member of the vehicle of FIG. 1 connected to an air spring.

One embodiment of a modular rough terrain vehicle is shown in FIG. 1 and is generally designated 10 and includes a frame generally designated as 12 for supporting a body 14 with at least one operator seat 16 allowing an operator to ride on the vehicle as it travels. This embodiment generally illustrates how the body 14 is maintained in a generally level orientation even though the vehicle traveling on a substantial incline. While this embodiment has four wheels 18, the preferred embodiment shown in FIGS. 2-7 is intended to depict a larger vehicle that has tandem rear wheels 18. The larger vehicle embodiment is not shown with the body for the sake of clarity, since the frame and structural features are more important to an understanding of the vehicle. It should also be appreciated that the same concepts explained below for the vehicle 10 are also applicable to a trailer being pulled by the vehicle which is shown in FIG. 11.

Figure 2:
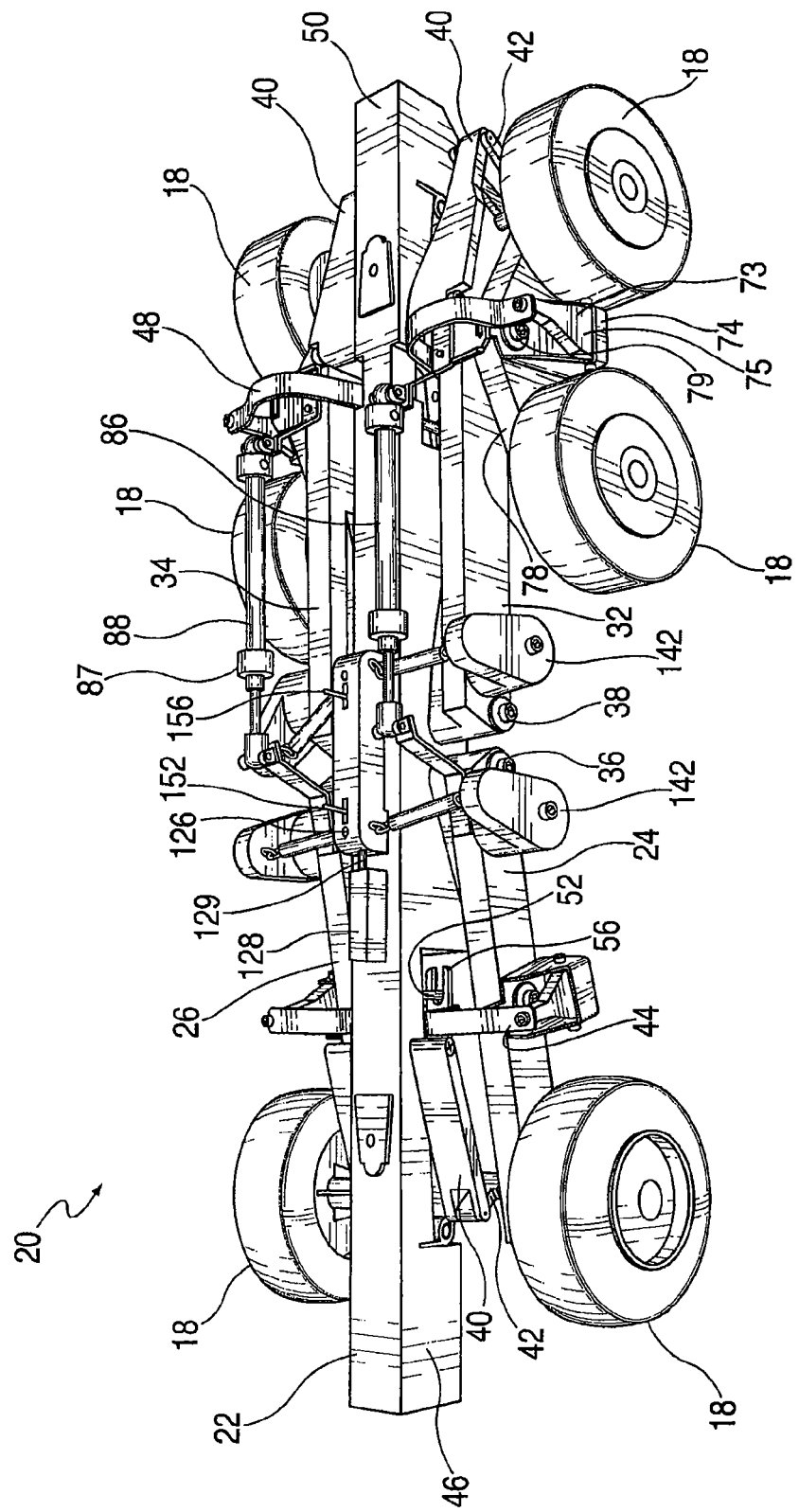
FIG. 2 is a top perspective view of the present modular rough terrain vehicle on even terrain with portions omitted for clarity.
Figure 3:
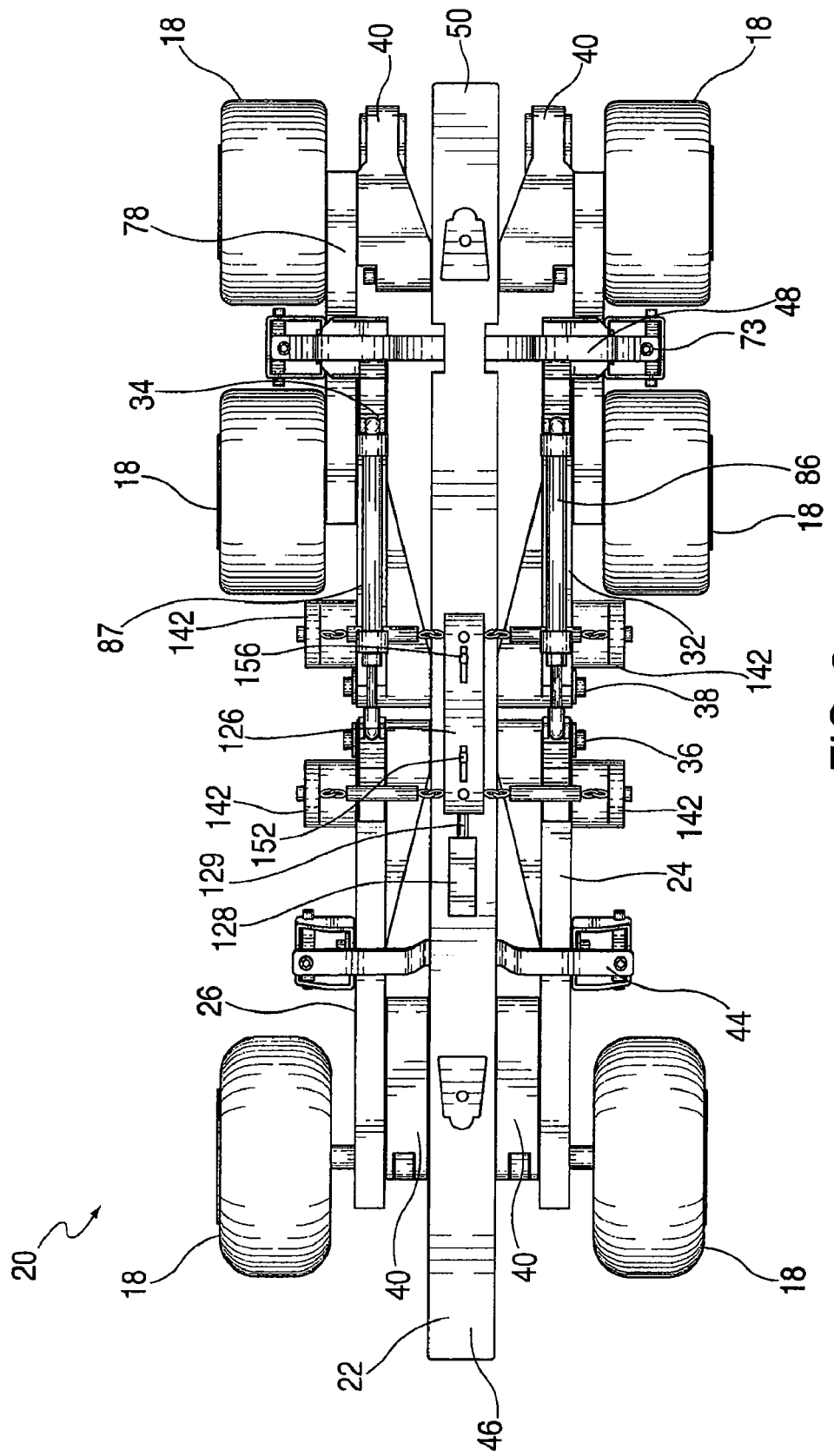
FIG. 3 is a top view of the present modular rough terrain vehicle with portions omitted for clarity.

As shown in FIGS. 2-3, the larger vehicle embodiment, indicated at 20, includes an elongated main frame 22 for supporting a body or a unified frame body with a V-shaped hull design (not shown). Attached to the main frame 22 are first and second forwardly-extending frame arms 24, 26. Each forwardly-extending frame arm 24, 26 includes a proximal end pivotably connected to the main frame 22 and a distal end having at least one rotatable wheel 18 mounted thereon. Also attached to the body are third and fourth rearwardly-extending frame arms 32, 34. Each rearwardly-extending frame arm 32, 34 also includes a proximal end pivotably connected to the main frame 22 and a distal end having at least one rotatable wheel 18 mounted thereon. It is preferred that the proximal ends of the first and third arms 24, 32 be adjacent to each other. Similarly, it is also preferred that the proximal ends of the second and fourth arms 26, 34 also be adjacent to each other.

In this embodiment, a first pivot axle 36 connects the proximal ends of the first and second frame arms 24, 26 and a second pivot axle 38 connects the proximal ends of the third and fourth 32, 34 frame arms. Each of the pivot axles 36, 38 permits relative movement of the attached frame arms 24, 26, 32, 34 about their associated pivot axle. It is preferred that axles 36, 38 be located near the center of the vehicle 10 and be positioned parallel to each other. It is also contemplated that a single center axle 36 or 38 may be used instead of two parallel axles. As should be appreciated, the modular frame 12 design of this embodiment uses interchangeable parts that allows for efficient maintenance and repair. In addition, this frame 20 design is also scalable to permit installation in vehicles 20 of various sizes.

In the preferred configuration, each frame arm 24, 26, 32, 34 further includes a stabilizer arm 40 interconnecting the main frame 22 and each frame arm for providing lateral stability of the distal end of each frame arm. Each stabilizer arm 40 includes at least one link 42 (see FIG. 5) and is extendable and retractable so that the main frame 22 is adjustable relative to the position of each frame arm 24, 26, 32, 34. It is preferred that the stabilizer arm 40 include the link 42 connected by a hinge or similar device and that each stabilizer arm is sufficiently wide to provide lateral stability to the distal end of each of the frame arms 24, 26, 32, 34. In addition, each stabilizer arm 40 functions to keep its corresponding wheel 18 generally parallel to the main frame 22.

Figure 4:
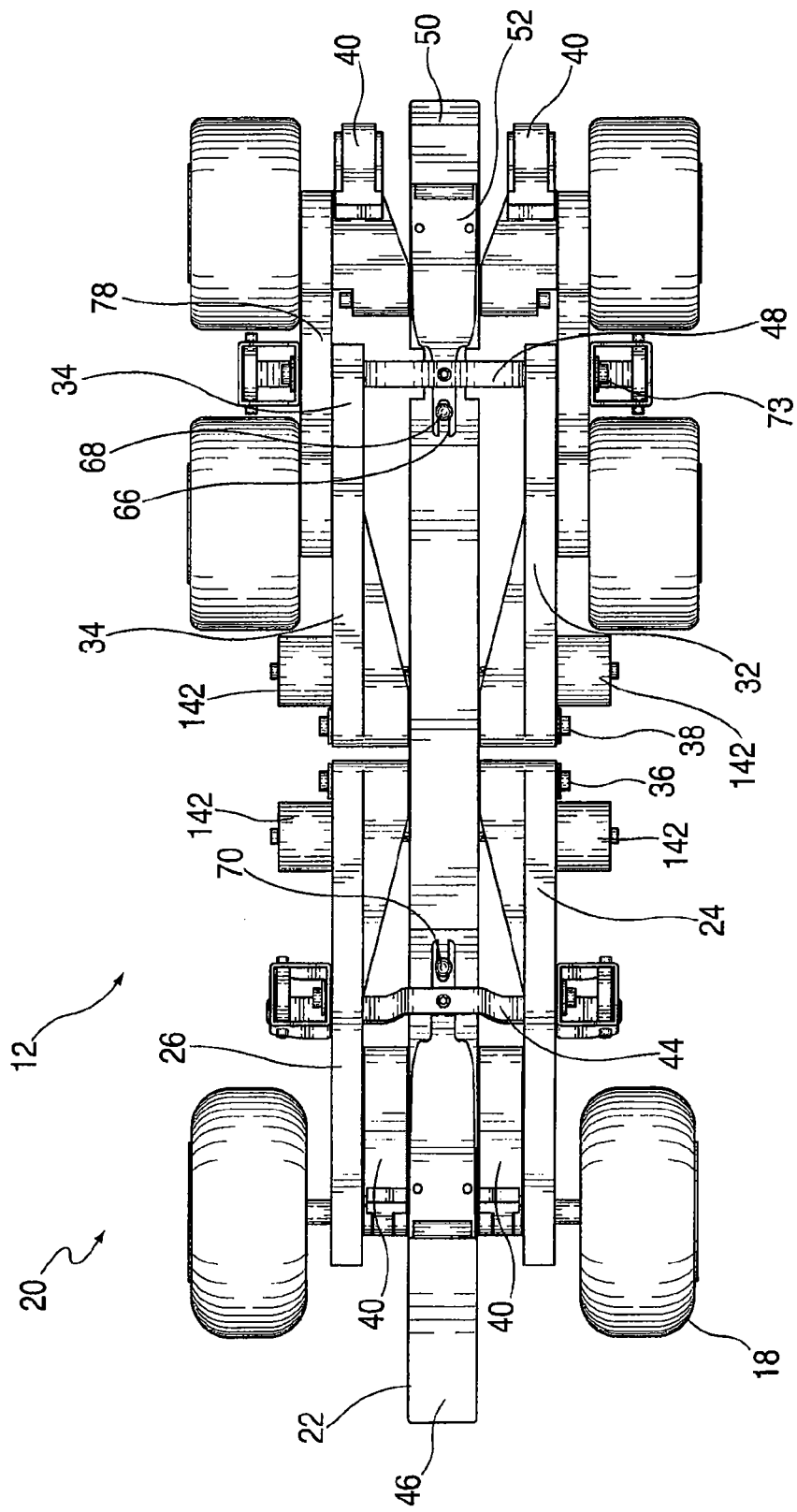
FIG. 4 is a bottom view of the present modular rough terrain vehicle with portions omitted for clarity.

As best shown in FIGS. 2-4, first 44 and second 48 cross-members are included to provide stability and secure the frame arms 24, 26, 34, 36 to the pivot axles 36, 38. The first cross-member 44 is pivotably connected to the first and second frame arms 24, 26 for supporting a frontward end 46 of the main frame 22 and a second cross-member 48 is pivotably connected to the third and fourth frame arms 32, 34 for supporting a rearward end 50 of the main frame 22. Each cross-member 44, 48 is generally U-shaped. However, other shapes are contemplated based on the application.

Figure 5:
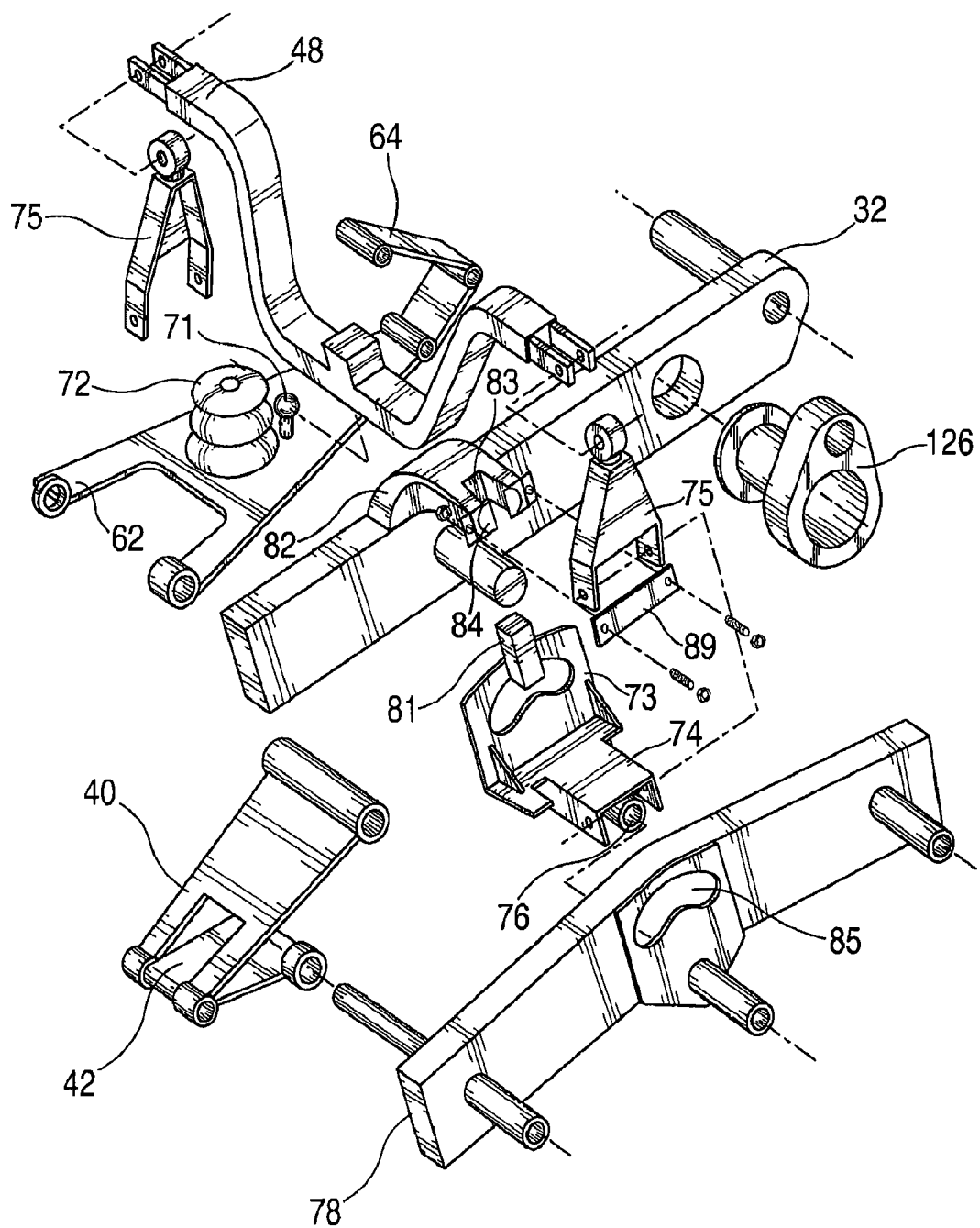
FIG. 5 is an exploded, somewhat schematic, perspective view of the present modular rough terrain vehicle with portions omitted for clarity.
Figure 6:
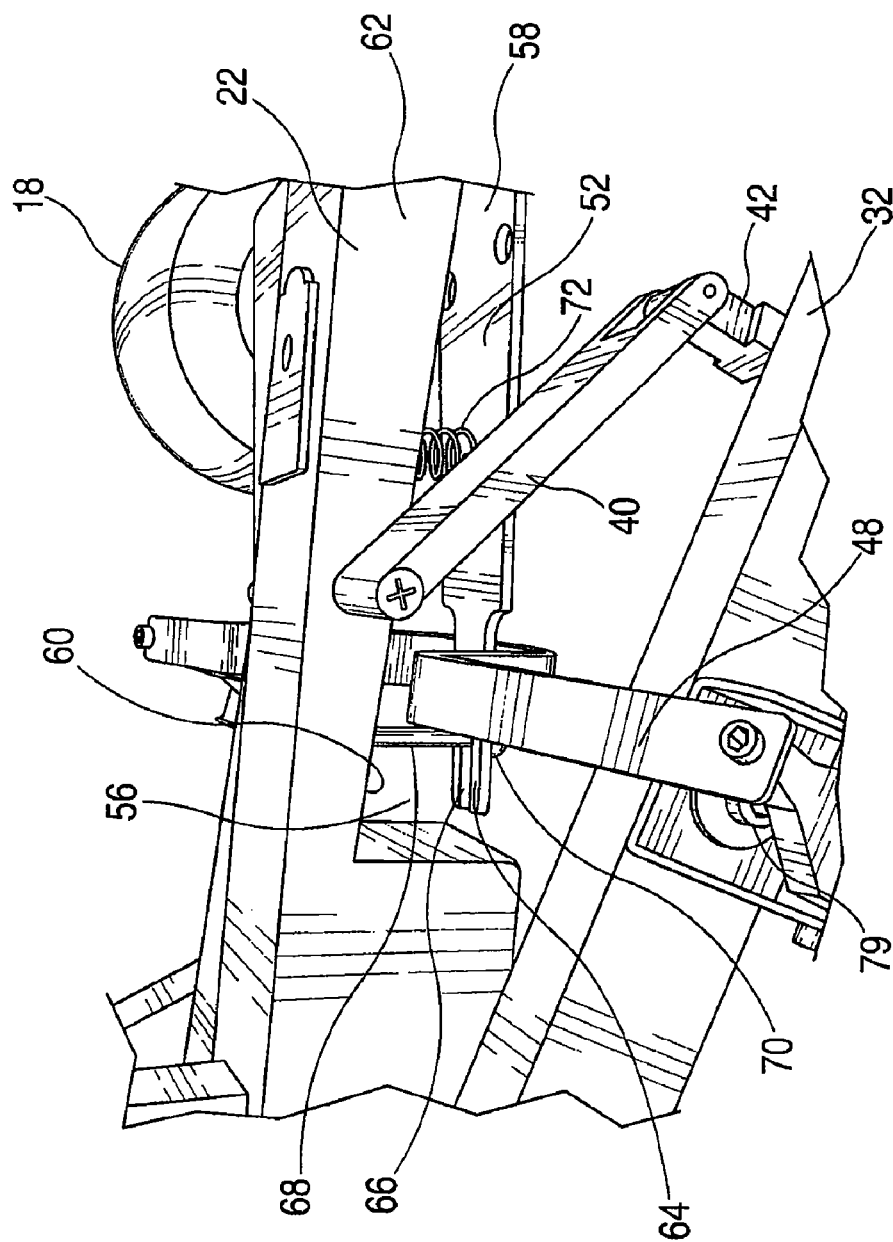
FIG. 6 is a side perspective view of the suspension system of the present modular rough terrain vehicle with portions omitted for clarity.

Referring now to FIGS. 4-6, both the forward 46 end and reward end 50 include a suspension system 52 mounted between the main frame 22 and the cross-members 44, 48. The suspension system 52 further stabilizes the vehicle 20 when traveling on uneven terrain by allowing vertical movement of the main frame 22 and attached body (not shown). While a particular suspension system 52 is set forth below, it is to be understood that other suspension systems 52 and configurations as known in the art are appropriate.

In this particular embodiment, the forward end 46 and rearward end 52 of the main frame 22 each include a cavity 56 where the suspension system 52 is mounted. Each suspension system 52 includes a suspension plate 58 which is affixed to a cavity ceiling 60 and extends generally along the length of the cavity 56. It is preferred that the plate 58 be elongated and triangular in shape. However, other shapes for the plate 58, such as rectangular, are contemplated. The plate 58 includes a fixed end 62 and a free end 64 located opposite to the fixed end. The fixed end 62 is preferably mounted to the portion of the cavity ceiling 60 located furthest from each respective pivot axle 36, 38 using a hinge that permits movement of the free end 64. Other suitable mounting mechanisms are contemplated for connecting the fixed end 62 to the cavity ceiling 60. The free end 64 includes an aperture 66 configured for receivably engaging a vertical rod 68 mounted to the cavity ceiling 60. The aperture 66 is sized to limit horizontal movement of the free end 64 while permitting vertical movement of the free end along the rod 68. In addition, the preferred configuration includes a stopper 70 to limit the magnitude of free end 64 vertical movement to the length of the rod 68. Alternatively, the free end 64 may be a hinge as shown in FIG. 5.

In addition, the plate 58 is connected to the cross member 44, 48, preferably using a rotary ball hitch 71 or similar device. The suspension system 52, 54 in this embodiment also includes a spring 72 positioned between the middle of the plate 58 and cavity ceiling 60. Other compressible and retractable devices such as inflatable flexible members or air bags may be used instead of the spring 72. The spring 72 or airbag helps absorb impact and provide comfort for the operator when the vehicle 20 encounters uneven terrain.

Figure 7A:
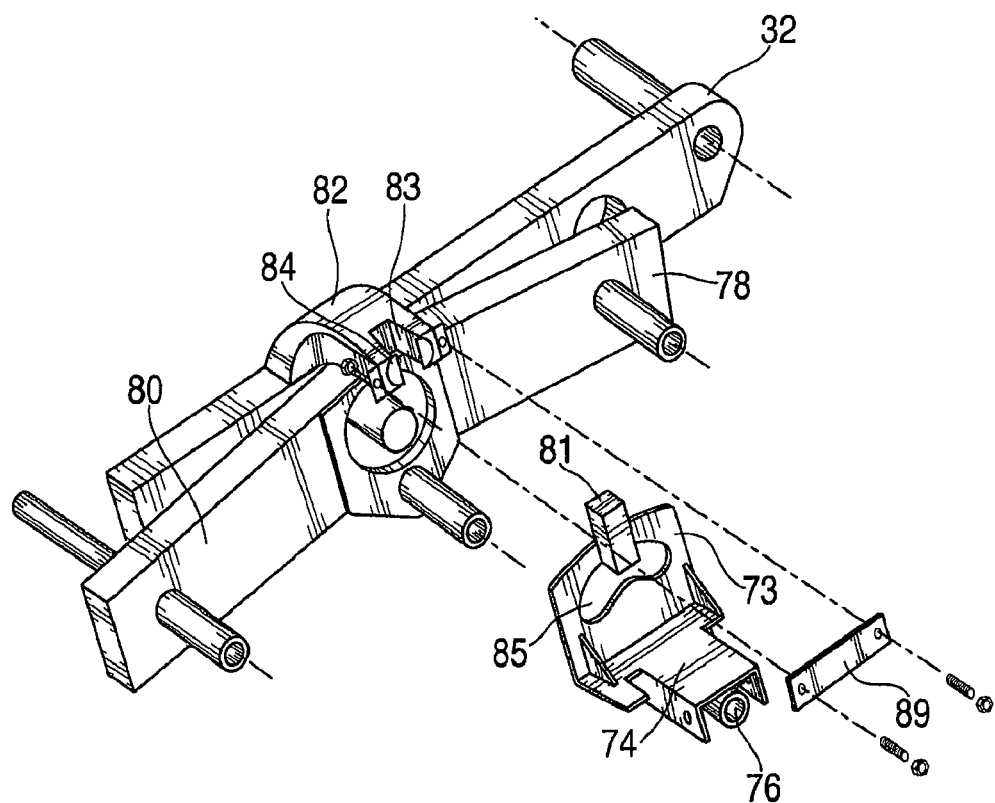
FIG. 7A is a side perspective view of the cross-member mounting assembly of the present modular rough terrain vehicle with portions omitted for clarity.

As illustrated in FIGS. 2, 3 and 7A, each cross-member 44, 48 connects to the corresponding frame arms 24, 26, 32, 34 using a cross-member mounting assembly 73 that includes a connection bracket 74 and a weight transfer arm 75. It is also contemplated that the cross-member mounting assembly 73 include a spring or air bag (not shown) connected to the cross-member 44, 48 and connection bracket 74 to provide additional stability. The connection bracket 74 is mounted to each frame arm 24, 26, 32, 34 using a pin 76 (FIG. 7A) or other suitable connection devices. The pin 76 allows for lateral movement of the mounting assembly 73 relative to the frame arm 24, 26, 32, 34. Further, the connection bracket 74 is preferably mounted to the frame arm 24, 26, 32, 34 at a position generally perpendicular to each cross-member 44, 48.

The weight transfer arm 75 is pivotably attached to each connection bracket 74 using a hinge or similar device. The opposite end of the weight transfer arm 75 is then attached to the corresponding cross-member 44, 48 using a ball joint (shown in FIG. 2), clevis connection (shown in FIG. 5.) or similar connection mechanism. As such, the ability of the weight transfer arm 75 to pivot permits side to side movement of the connected cross-member 44, 48 when uneven terrain is encountered. In addition, the mounting assembly 73 links the main frame 22 with each frame arm 24, 26, 32, 34 via the cross-members 44, 48 so that the frame arms are in synchronization and appropriately adjust when uneven terrain is traveled.

In a multiple wheel configuration, such as the six wheel 18 configuration shown in FIGS. 2-4, a tandem arm 78 is connected to the distal end of the corresponding frame arm 32, 34 for supporting additional wheels 18. In the six wheel 18 configuration, the tandem arm 78 is generally v-shaped and includes two wheels 18 rotatably mounted at each end. Further, the tandem arm 78 is pivotably affixed to the frame arm 32, 34 using an axle or other suitable device that permits relative movement of the attached frame arms 32, 34 about the axle. In this embodiment, the axle is of sufficient length to extend through the tandem arm 78 so that an axle cap 79 (see FIGS. 2 and 6) can be secured onto the end of the axle. However, it is also contemplated that the axle terminate so that it is flush with the tandem arm surface 80.

Referring now to FIGS. 5 and 7A, in the multi-wheel 18 configuration, each connection bracket 74 is mounted to the tandem arm 78 instead of the frame arm 32, 34. Similar to the four wheel configuration described above, the bottom portion of the connection bracket 74 is mounted to the tandem arm 78 using a pin 76 or other suitable device that permits movement of the mounting assembly 73 relative to the tandem arm. Also similar to the four wheel 18 vehicle 20 configuration, the corresponding cross-member 44, 48 connects to the weight transfer arm 75.

Figure 7B:
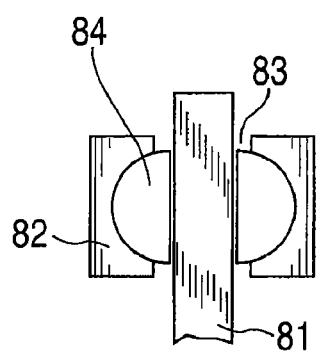
FIG. 7B is a front view of the tab inserted in the opening of the frame extension plate with the tab at a neutral position.
Figure 7C:
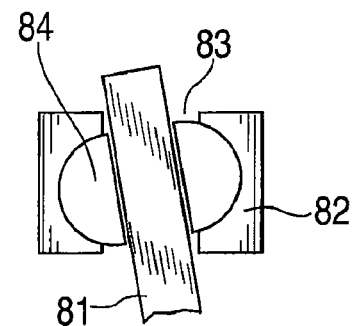
FIG. 7C is a front view of the tab inserted in the opening of the frame extension plate with the tab at a rotated position.

However, the top portion of the connection bracket 74 further includes a tab 81 that engages a frame extension 82 secured to the frame arm 32, 34. The tab 81 connects to the frame extension 82 through an opening 83. Since the tab 81 is affixed to the frame arm 32, 34 through the frame extension 82, it is able to move vertically in the opening 83 when the vehicle 20 traverses uneven terrain. This maintains the connection bracket 74 in a generally centered position relative to the cross-member 44, 48. Accordingly, the width of the tab 81 should be less than the width of the opening 83 to permit such vertical movement. As best shown in FIGS. 7B and 7C, in this configuration, the opening 83 also includes two half round inserts 84 that permit angular movement of the tab 81. In operation, the half rounds 84 rotate in its holder and allow the tab 81 to move forwardly and rearwardly in addition to the vertical movement described previously. This feature is best shown in FIGS. 7B and 7C. The amount of horizontally movement permitted by the tab 81 can be controlled by adjusting the width of the tab and half rounds 84. The tab 81 is secured by a locking plate 89 (FIG. 7A) affixed to the front of the frame extension 82.

Additionally, as shown in FIG. 7A, in the six wheel vehicle 20 configuration where an axle cap 79 (shown in FIG. 2) is present, the connection bracket 74 includes an aperture 85 in the upper portion of the bracket. The aperture 85 is preferably elliptical and sized for receiving the axle cap 79. Furthermore, the aperture 85 should be of sufficient size to allow lateral movement of the axle cap 79 when either of the wheels attached to the tandem arm 78 encounters uneven terrain. As such, the aperture 85 functions to maintain equal weight on each wheel 18 mounted to the tandem arm 78 when the wheels attached to the tandem arm encounter uneven terrain.

Finally, in the six wheel vehicle 20 configuration, the stabilizer arm 40 associated with the frame arm 32, 34 attached to the tandem arm 78 connects to the main frame 22 and the tandem arm 78 instead of the frame arm. While a six wheel vehicle 20 configuration is explained above, it should be appreciated that an eight wheel or additional configurations are contemplated using the same techniques.

Referring now to FIGS. 2-4, the vehicle 20 includes a first and second length-adjustable member 86, 87, each respectively connected to the main frame 22 and the first frame arm 24 and second frame arm 26. In an alternate configuration, instead of attaching to the main frame 22, the first length-adjustable member 86 attaches to the third frame arm 32 and the second length-adjustable member 87 attaches to the fourth frame arm 34. The length-adjustable member 86, 87 connected to the main frame 22 may include an air spring 77 (FIG. 11) or similar shock absorbing device to provide additional stability and shock absorption. In this configuration, one end of the length adjustable member 86, 87 is attached to a first fixed post 91 and the opposite end is attached to a pivot post 93 positioned on the main frame 22 or the third or fourth frame arm 32, 34. An airbag or air spring 77 is then connected to the pivot post and a second fixed post 95 positioned at the opposite end of air spring 77. Movement of the pivot post 93 compresses and releases the airbag or spring 77 to absorb rough terrain shocks and maintains body 14 control while the vehicle 10 travels over rough terrain. In operation, selective movement of the first length-adjustable member 86 causes the distal end of the first frame arm 24 to move up or down. Similarly, selective movement of the second length-adjustable member 87 causes the distal end of the second frame arm 26 to move up or down. As such, the length-adjustable members 86, 87 work together to adjust the position of each frame arm 24, 26, 32, 34 and keep the main frame 22 level when uneven terrain is encountered.

In the illustrated embodiment, the length-adjustable member 86, 87 comprises a hydraulic cylinder 88 having an extendable and retractable piston rod 90. While the attachment of the cylinder 88 is not shown in any detail, its manner of attachment is well known to those of ordinary skill in the art. It should also be understood that other length-adjustable members 86, 87 commonly used in the art are contemplated. In addition, each length adjustable member 86, 87 may include a lock (not shown) to prevent movement of the length adjustable member. Such a feature facilitates high speed movement of the vehicle 20 on level terrain. Alternatively, the lock may also be used to maintain the vehicle 10 in a level position when parked.

Figure 8:
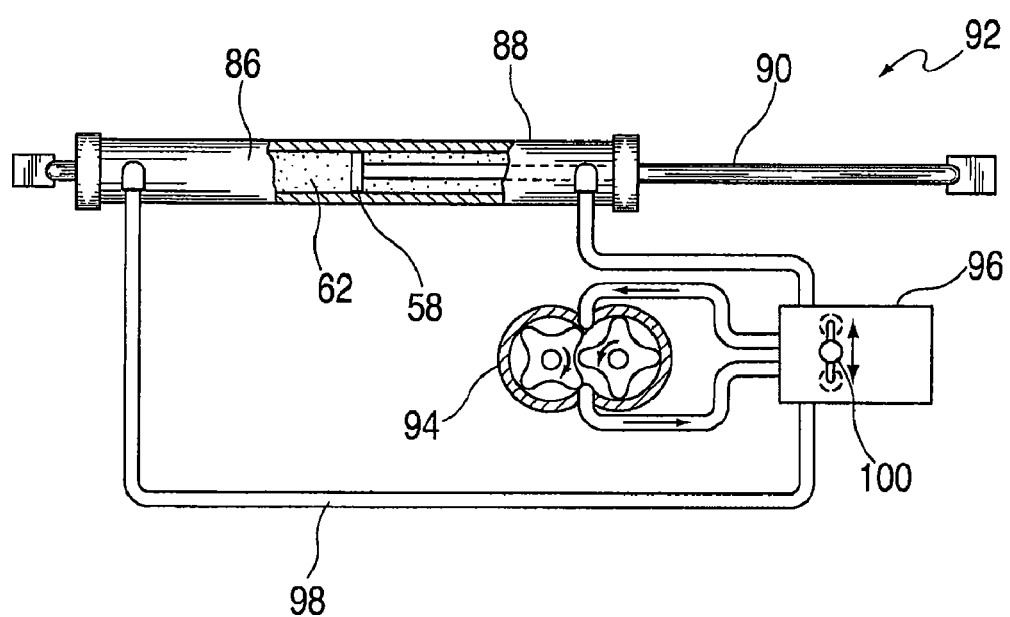
FIG. 8 is a top plan view of the hydraulic control system of the present invention.

As best shown in FIG. 8, a control device 92 is operatively associated with the length-adjustable members 86, 87 for adjusting the relative positions of the first and second frame arms 24, 26 about a neutral baseline. The control device 92 adjusts the position of the rod 90 in the cylinder 88 so that an extension or retraction of the length-adjustable member 86, 87 respectively causes the frame arms 24 and 26 to move above or below a neutral wheelbase line. In this embodiment, the control device 92 is in the form of a hydraulic system that includes a hydraulic pump 94, a control valve 96 and hydraulic hoses 98. The setup of such control devices 92 are commonly known in that art.

The valve 96 is operable to selectively adjust the pressure of the hydraulic fluid in either the front or rear of the cylinder 88 which either extends or retracts the rod 90 relative to the cylinder 88. In various embodiments, the control valve 96 may be operated by the driver or may include a device for automatically controlling the pump 94. In one embodiment, the control valve 96 may include a lever 100 for manual operation to adjust the position of the rod 90 enabling the operator to selectively raise or lower either side of the vehicle 20 to conform to a particular terrain.

Figure 9:
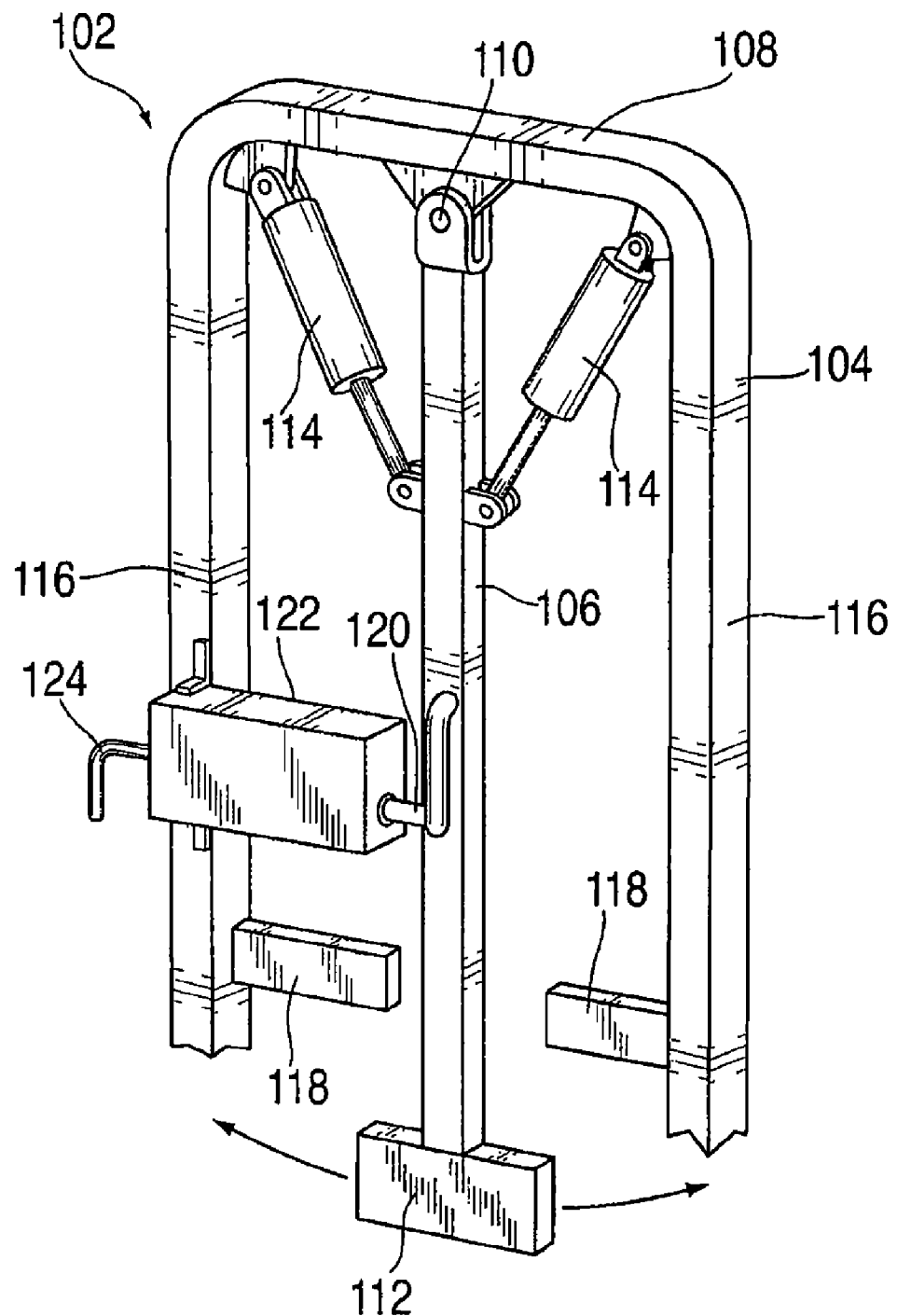
FIG. 9 is a perspective view of an automatic leveling detector for this invention.
Figure 10:
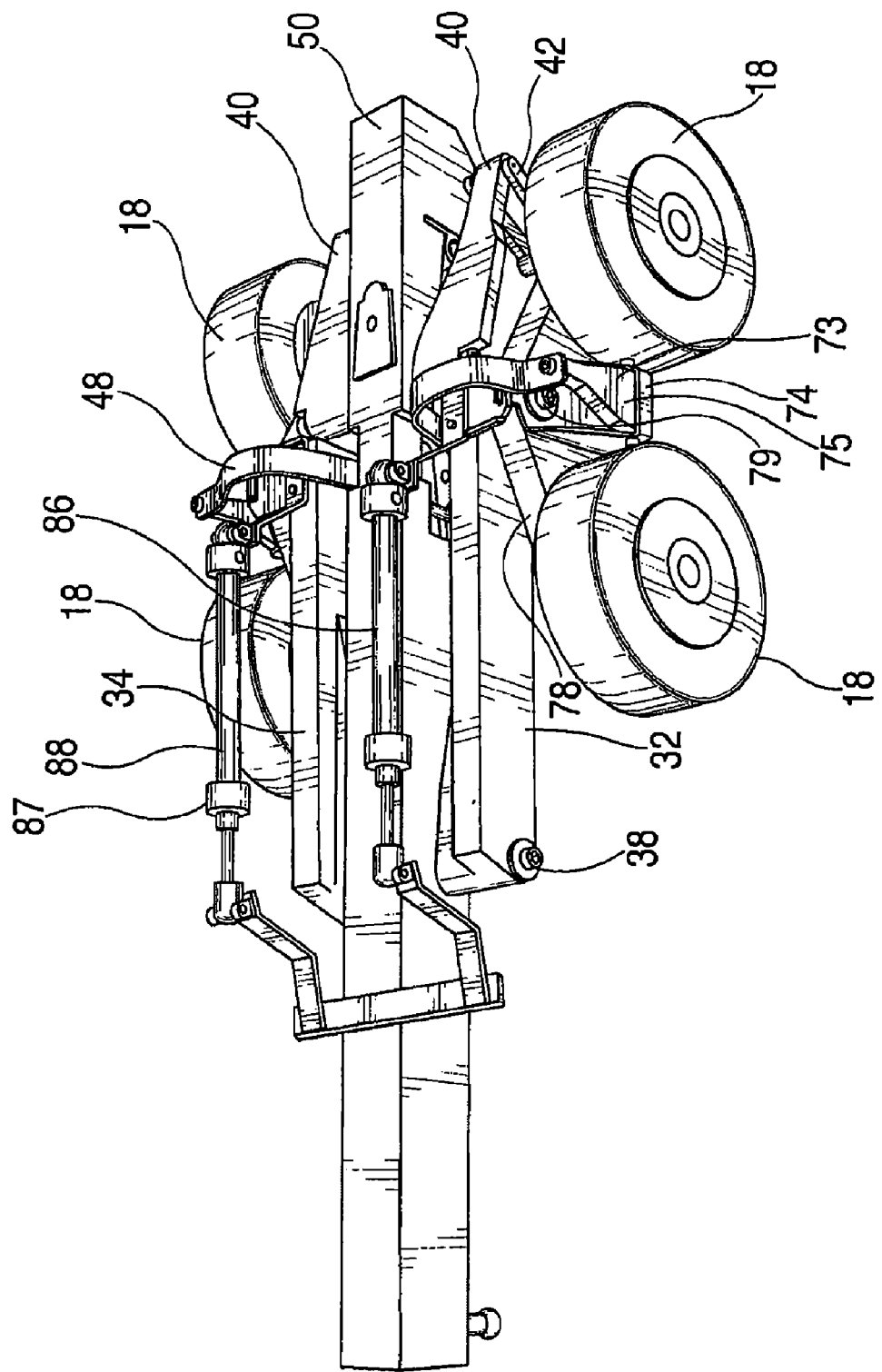
FIG. 10 is a top perspective view of a trailer for traveling over rough terrain with portions omitted for clarity.

Instead of operating the control device 92 manually, the control valve 96 may be connected to an automatic leveling system 102 for automatically adjusting the relative height of the first and second frame arms 24 and 26 and leveling the vehicle 20. Preferably, the automatic leveling system is positioned in the center of the vehicle 20 near the operator 17. In an embodiment shown in FIG. 9, the automatic leveling system 102 includes a generally inverted, U-shaped pendulum support bar 104 which may also serve as a roll bar for the vehicle 20. A pendulum 106 has its upper end connected to a top portion 108 of the support bar 104 by a pivot pin 110, which allows it to pivot in the lateral direction. The lower end of the pendulum 106 preferably includes a weight 112 for providing inertia to the pendulum 106 so that it does not move or change directions of movement quickly. In addition, a dampening structure in the form of air or hydraulic shock absorbers 114 extend from the support bar 104 and are connected to the pendulum 106 for dampening movement of the pendulum in the lateral direction. The bar 104 has legs 116 which are provided with a pair of stops 118 for limiting lateral movement of pendulum 106.

A translation member 120 is operatively connected to pendulum 106 for translating lateral movement of the pendulum into corresponding actions of the control valve 96 to level the vehicle. In the embodiment shown in FIG. 9, the translation member 120 takes the form of a moveable piston structure connected to the pendulum 106 and being slidably received in a control box 122. As the horizontal axis of the vehicle 20 tips in either direction, the pendulum 106 will correspondingly move and result in a movement of the piston structure 120 within the control box 122. The control box 122 is operatively connected to the control valve 96 by a line 124 and provides input signals to the control valve for controlling movement of the hydraulic cylinder 88. In particular, if the pendulum 106 tilts in one direction in response to the vehicle 20 traversing uneven ground, the piston 90, control box 122 and line 124 will provide a signal to the control valve 96 to raise or lower the corresponding frame arm 24, 46. Thus, the vehicle 20 where the operator is located is kept at a relatively level orientation. Other automatic leveling systems may also be employed in the vehicle 20 of the present invention, such as using a mercury switch which can detect if the vehicle is out of level and send an appropriate electrical signal to the control device 92 for automatically leveling the vehicle.

The vehicle 20 may be powered by an internal combustion, hydraulic or electric motor 128 and includes a drive train, indicated generally at 126, to power the wheels 18. Such drive train 126 systems are commonly known in the art with examples including a belt or a chain drive. A hydraulic motor may also be included for rotating each wheel 18. Various vehicle 20 configurations for the number powered wheels are contemplated including 4×2 (4 wheels, 2 powered), 4×4 (4 wheels, 4 powered) and 6×4 (6 wheels, 4 powered). While not shown, the body is preferably v-shaped when viewed from the front or rear. Such a design allows for greater movement of the frame arms 24 26, 32, 34 in a vertical motion when the vehicle 20 is traversing uneven terrain and provides additional stability.

Figure 12:
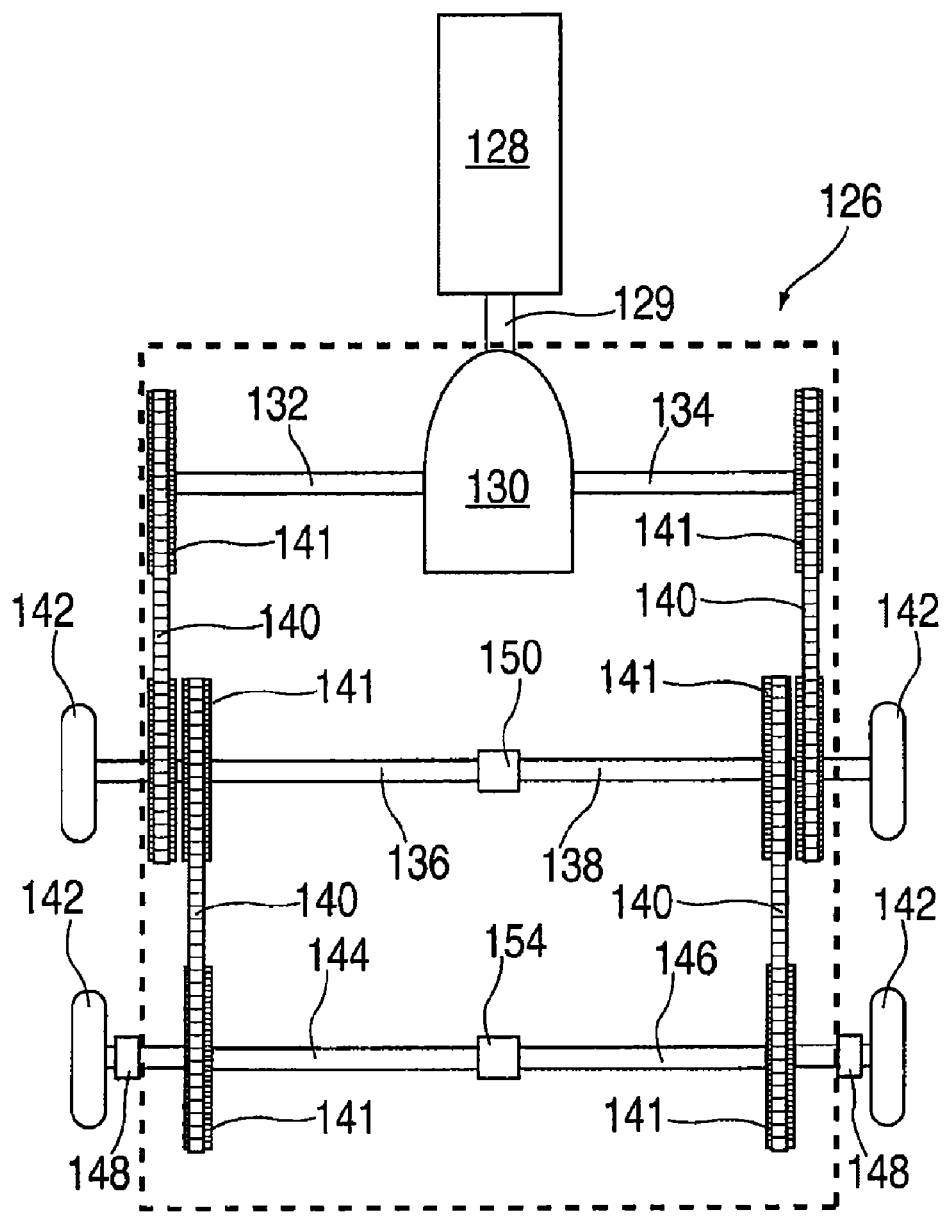
FIG. 12 is a top view of a drive train system used in the vehicle of FIG. 1.

Referring now to FIG. 12, the preferred embodiment includes a three shaft drive train 126 to distribute power to the wheels 18. Power is provided by the motor 128 through a drive shaft 129 to a differential 130. The differential 130 is connected to a first left shaft 132 and a first right shaft 134. Both the first left shaft 132 and the first right shaft 134 each are respectively operatively associated with a second left shaft 136 and a second right shaft 138. Power is transferred from the first shafts 132, 134 to the respective second shafts 136, 138 with a chain drive 140. Power is then transferred from the second shafts 136, 138 to a gear box 142, which in turn transfers power to the front wheels 18. Preferably, power is transferred from the gear box 142 to the wheel using a chain drive (not shown) located inside each of the frame arms 24 26, 32, 34.

Rear wheel power is achieved though a chain drive connection 140 between the second left shaft 136 and a third left shaft 144 and the second right shaft 138 and a third right shaft 146. Similar to the front wheels 18, power is transferred from the third shafts 144, 146 to a gear box 142, which in turn transfers power to each rear wheel 18 via a chain drive (not shown). In the case where the vehicle 10 includes a tandem arm 78 with multiple wheels 18 attached, power may be transferred from the gear box 142 to a second gear box (not shown) which transfers power to the wheels positioned on the tandem arm.

A drive control lever (not shown) is preferably provided for engaging or disengaging a shaft connection 148 between the third shafts 144, 146 and the corresponding gear box 142. By engaging and disengaging the shaft connection 148, the operator dictates whether power goes to the front wheels 18, or both the front and rear wheels.

Additionally, a second shaft pin 150 attached to a corresponding second shaft lever 152 (FIG. 2) is provided for connecting the second left shaft 136 and second right shaft 138. Similarly, a third shaft pin 154 attached to a corresponding third shaft lever 156 (FIG. 2) is provided for connecting the third left shaft 144 and the third right shaft 146. As such, when the pin 150 or 154 is in a locked position, the corresponding shaft 136 and 138 or 144 and 146 operates as a single locked shaft where power is distributed equally to the right and left wheels 18. As should be appreciated, this configuration provides the operator flexibility regarding the amount of power being distributed to each wheel 18 relative to other wheels. Additional drive train systems are also contemplated with one such example including using a locking differential as the initial receptor of power. Such systems are known in the art.

Operation as the vehicle 20 traverses uneven terrain will now be described. When the vehicle 20 travels along the surface of a slanted grade, the automatic level detector 102 sends a signal to the control device 96 indicating the direction and magnitude of adjustment required by each length-adjustable member 86 and 87 to keep the operator 17 in a relatively level position. The length adjustable member 86, 87 then adjusts the position of each corresponding front frame arm 24 and 26 based on the signal sent from the control device 92. Once the front frame arms 24 and 26 adjust, the rear frame arms 32 and 34 move up and down against the terrain to keep the frame 14 and operator at a level position. As such, the main frame 22 is kept in a level position. The body (not shown) is supported by the main frame 22, and the driver therefore enjoys a comfortable and level driving position while the vehicle 20 travels along the slanted grade.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A rough terrain vehicle comprising:

a body for a vehicle operator to ride in;

an elongated main frame for supporting said body;

first and second forwardly-extending frame arms located on opposite sides of said main frame, each of which includes a proximal end and a distal end, each said proximal end being pivotably connected to said main frame, and each said distal end having at least one rotatable wheel mounted thereon;

third and fourth rearwardly-extending frame arms located on opposite sides of said main frame, each of which includes a proximal end and a distal end, each said distal end having at least one rotatable wheel mounted thereon;

a first pivot axle for connecting said proximal ends of said first and said second frame arms, said first pivot axle permitting relative movement of said first and said second frame arms about said first pivot axle;

a second pivot axle for connecting said proximal ends of said third and said fourth frame arms, said first pivot axle permitting relative movement of said third and said fourth frame arms about said second pivot axle;

a first generally U-shaped cross member pivotably connected to said first and second frame arms and supporting a forward end of said main frame;

a second generally U-shaped cross-member pivotably connected to said third and fourth frame arms and supporting a rearward end of said main frame;

said cross members being configured to enable said main frame and said frame arms to pivot about a lengthwise axis of said main frame for the purpose of maintaining said main frame level from side to side;

a first length-adjustable member operatively connected to said first frame arm and said third frame arm; selective movement of said first length-adjustable member causing said distal end of said first frame arm to move up or down;

a second length-adjustable member operatively connected to said second frame arm and said fourth frame arm; selective movement of said second length-adjustable member causing said distal end of said second frame arm to move up or down; and a level detector for producing and applying leveling signals to each of said length-adjustable members;

said leveling signals causing each of said length-adjustable members to position each said first and second frame arms such that said elongated main frame is maintained in a relatively level orientation when said vehicle encounters uneven terrain.

2. The rough terrain vehicle as defined in claim 1 wherein said first length-adjustable member is operatively connected to said main frame and said first frame arm and said second length-adjustable member is operatively connected to said main frame and said second frame arm.

3. The rough terrain vehicle as defined in claim 1 wherein said proximal ends of said first and third arms are adjacent to each other and said proximal ends of said second and fourth arms are adjacent to each other.

4. The rough terrain vehicle of claim 1 wherein said elongated main frame further comprises first and second suspension systems mounted between said main frame and said first and second cross member.

5. The rough terrain vehicle of claim 1 wherein each frame arm further includes a stabilizer arm interconnecting said main frame and each said frame arm for providing lateral stability of said distal end to each said frame arm.

6. The rough terrain vehicle of claim 5 wherein each stabilizer arm includes a link and is extendable and retractable so that the main frame is adjustable relative to the position of the frame arm.

7. The rough terrain vehicle of claim 5 wherein each stabilizer arm is sufficiently wide to provide lateral stability of said distal end to each said frame arm.

8. The rough terrain vehicle of claim 5 wherein said stabilizer arms interconnecting said main frame and each of said third frame arm and said fourth frame arm are connected to a tandem arm.

9. The rough terrain vehicle of claim 1 wherein each said third and fourth arm distal ends further comprises a tandem arm operatively connected to said frame arm distal end with a tandem arm pivot axle, and said tandem arm is pivotable about said tandem arm pivot axle and having rotatable wheels mounted thereto.

10. The rough terrain vehicle of claim 9 wherein each of said tandem arms is operatively connected to said frame arms using a pin and a frame extension with an aperture and a tab inserted through said aperture.

11. The rough terrain vehicle of claim 1 wherein each of said length-adjustable members comprise a hydraulic cylinder having an extendable and retractable piston rod and one of each cylinder and rod is connected to the third and fourth arms.

12. The rough terrain vehicle of claim 1 wherein said level detector further includes:
    a pendulum connected to the top portion of said support bar;
    a translation member operatively connected to said pendulum for translating lateral movement of said pendulum into corresponding action to level said vehicle; and
    a control box to send signals to said length-adjustable member for controlling movement of said wheel assemblies.

13. The rough terrain vehicle as defined in claim 1 further comprising a drive train including:
    a first shaft for receiving power from a differential; and
    a second shaft for receiving power from said first shaft and for transferring power to a gear box operatively associated with the wheels mounted on said first and second forwardly-extending frame arms.

14. The rough terrain vehicle as defined in claim 13 further comprising a third shaft for receiving power from said second shaft and for transferring power to a gear box operatively associated with the wheels mounted on said third and fourth rearwardly-extending frame arms.

15. The rough terrain vehicle of claim 13 wherein said second shaft and said third shaft are each separable into a right shaft and a left shaft wherein each right shaft and each left shaft transfers power independently.

* * * * *